Figure 10:
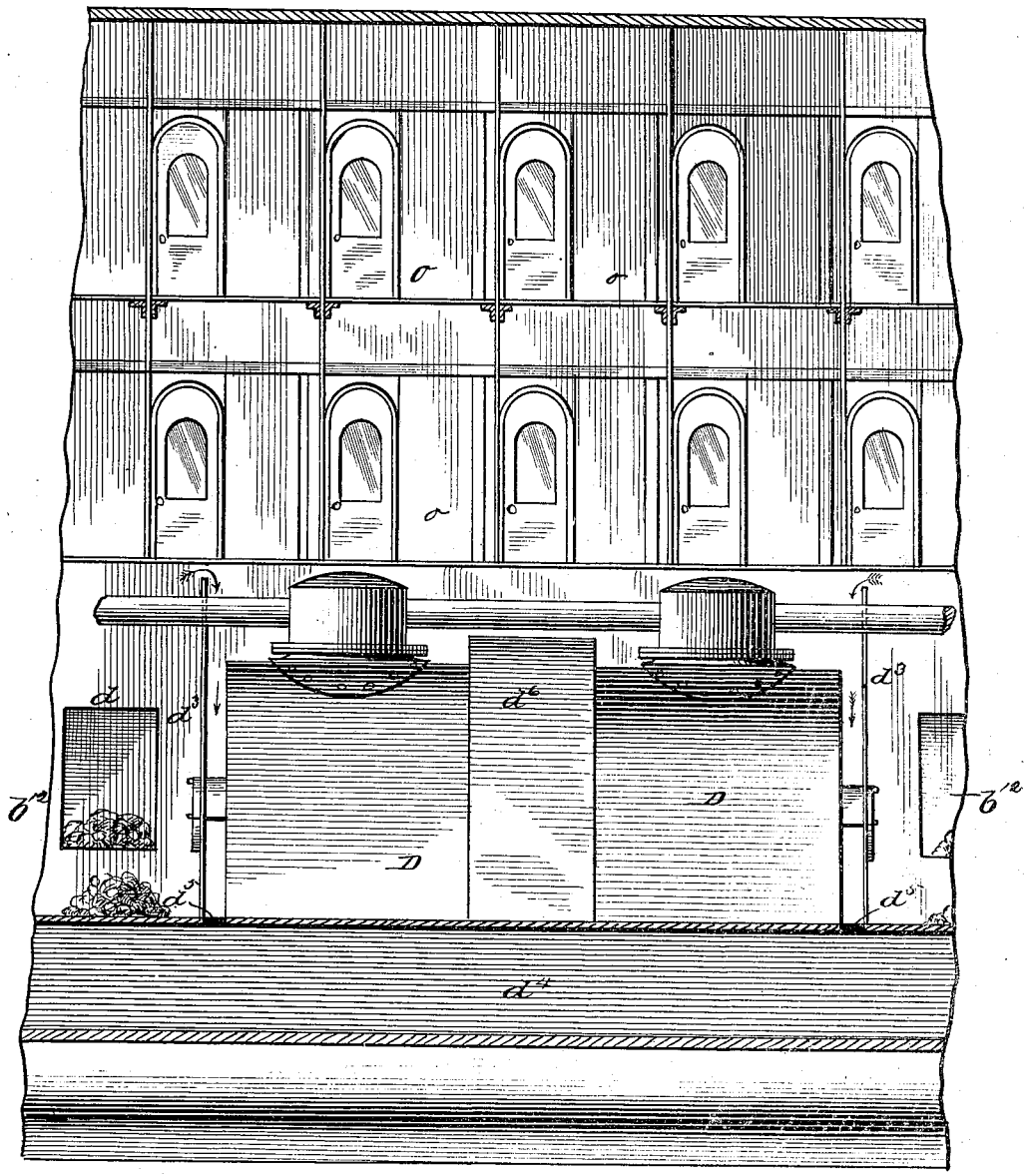

(No Model.)　　　　　　　　　　R. M. FRYER.　　　　　15 Sheets—Sheet 1.
CONSTRUCTION OF SHIPS.
No. 356,065.　　　　　　　　　　Patented Jan. 11, 1887.
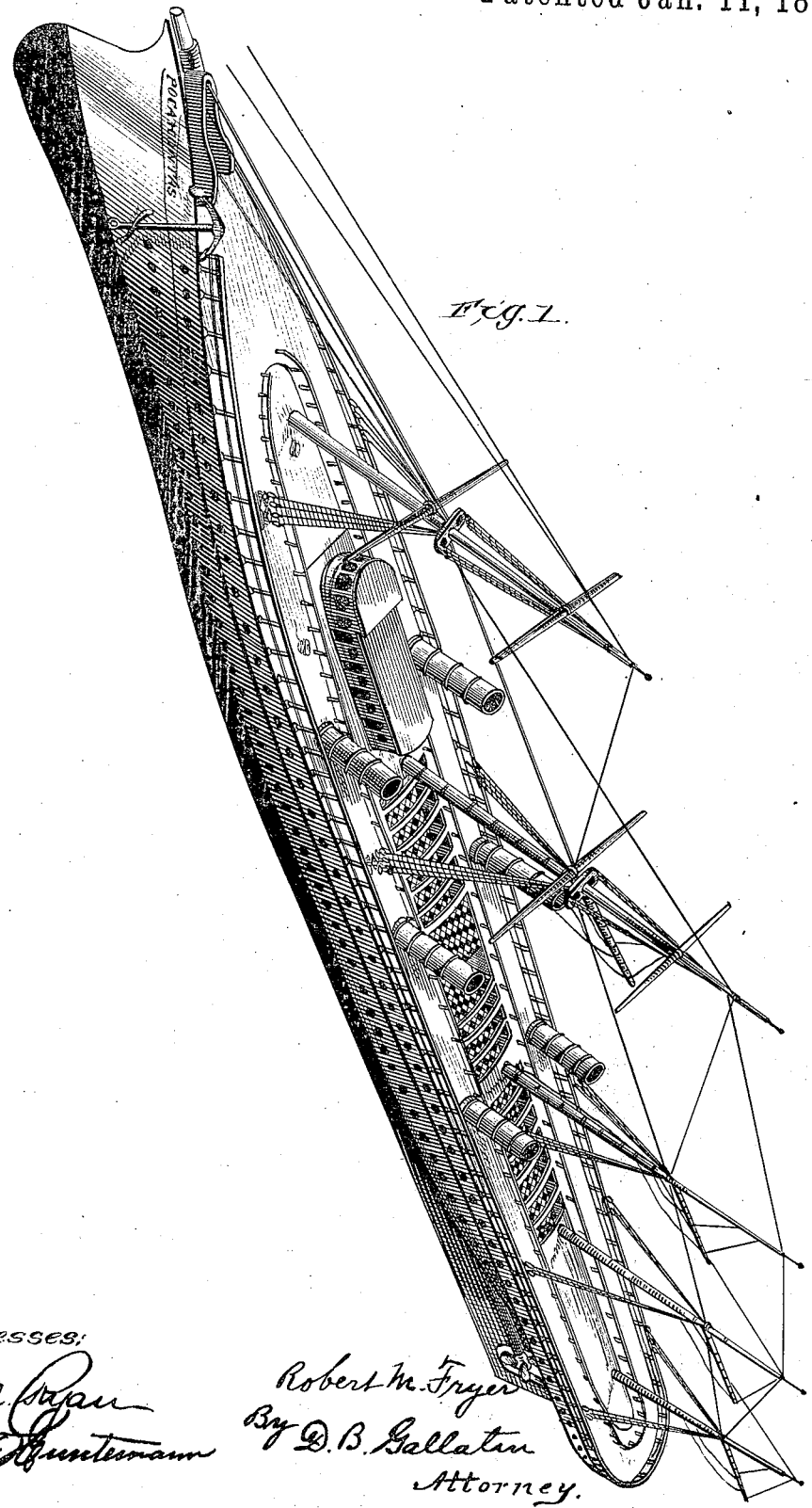

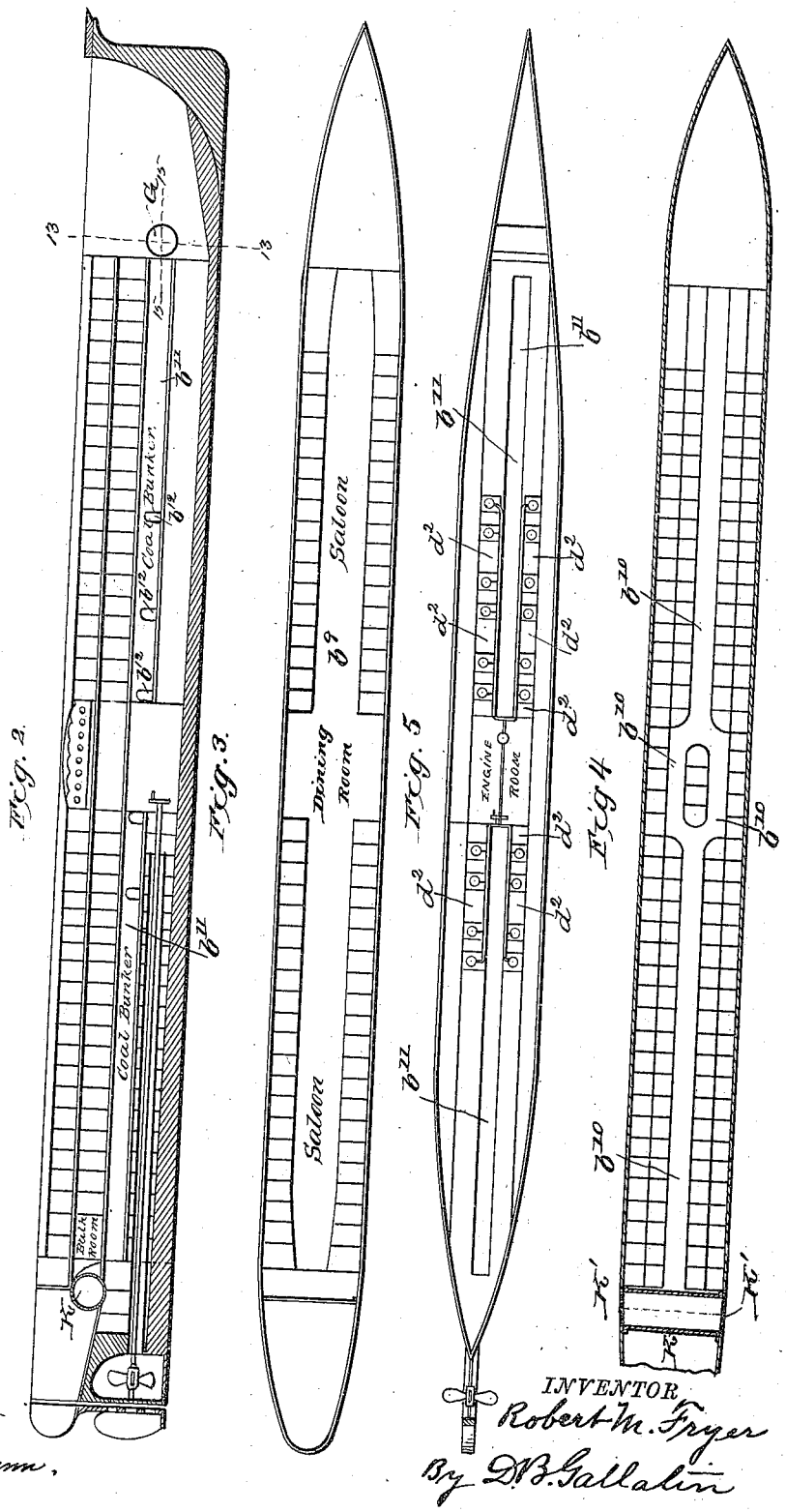

(No Model.)  
R. M. FRYER.  
CONSTRUCTION OF SHIPS.
No. 356,065. Patented Jan. 11, 1887.
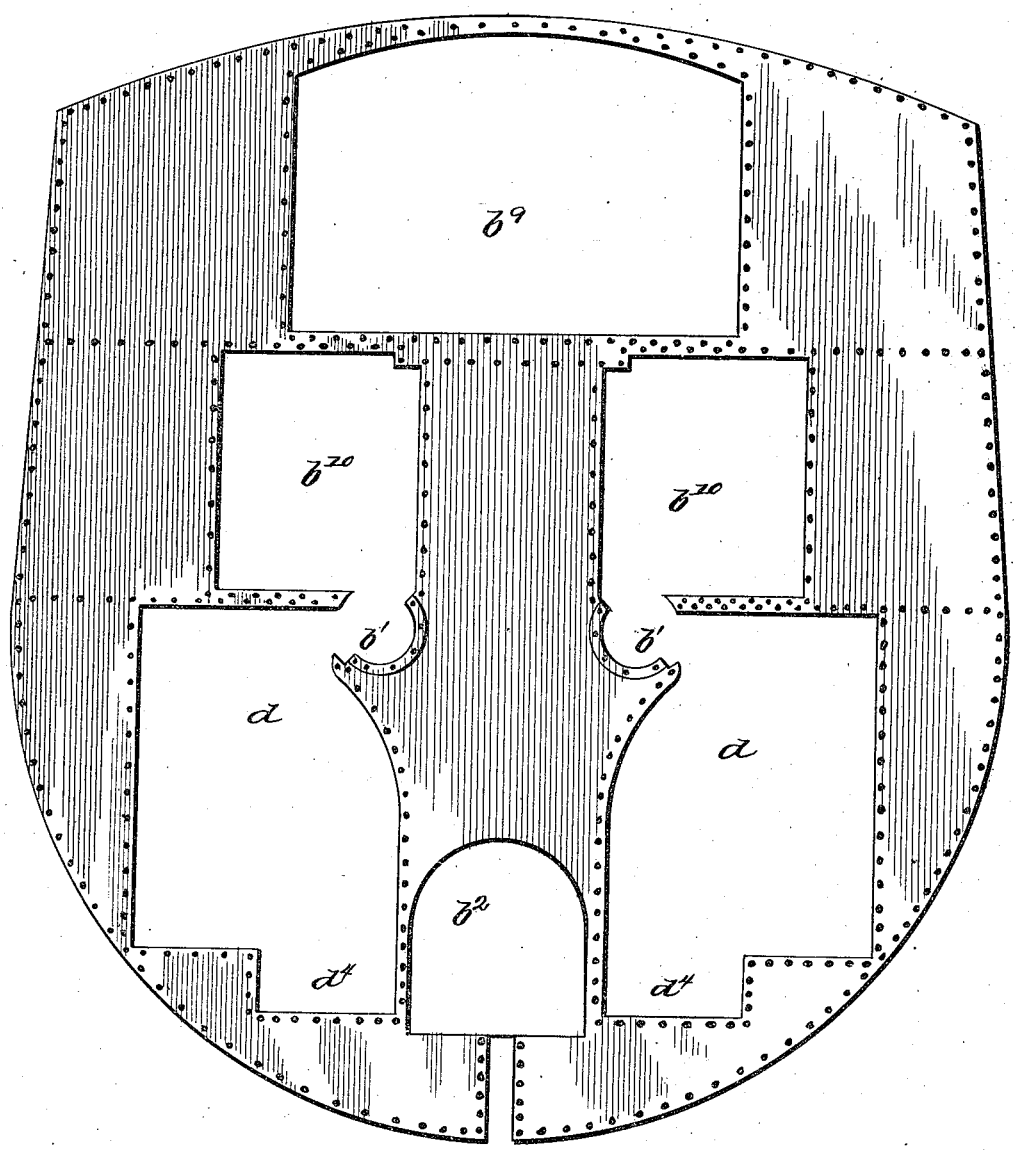

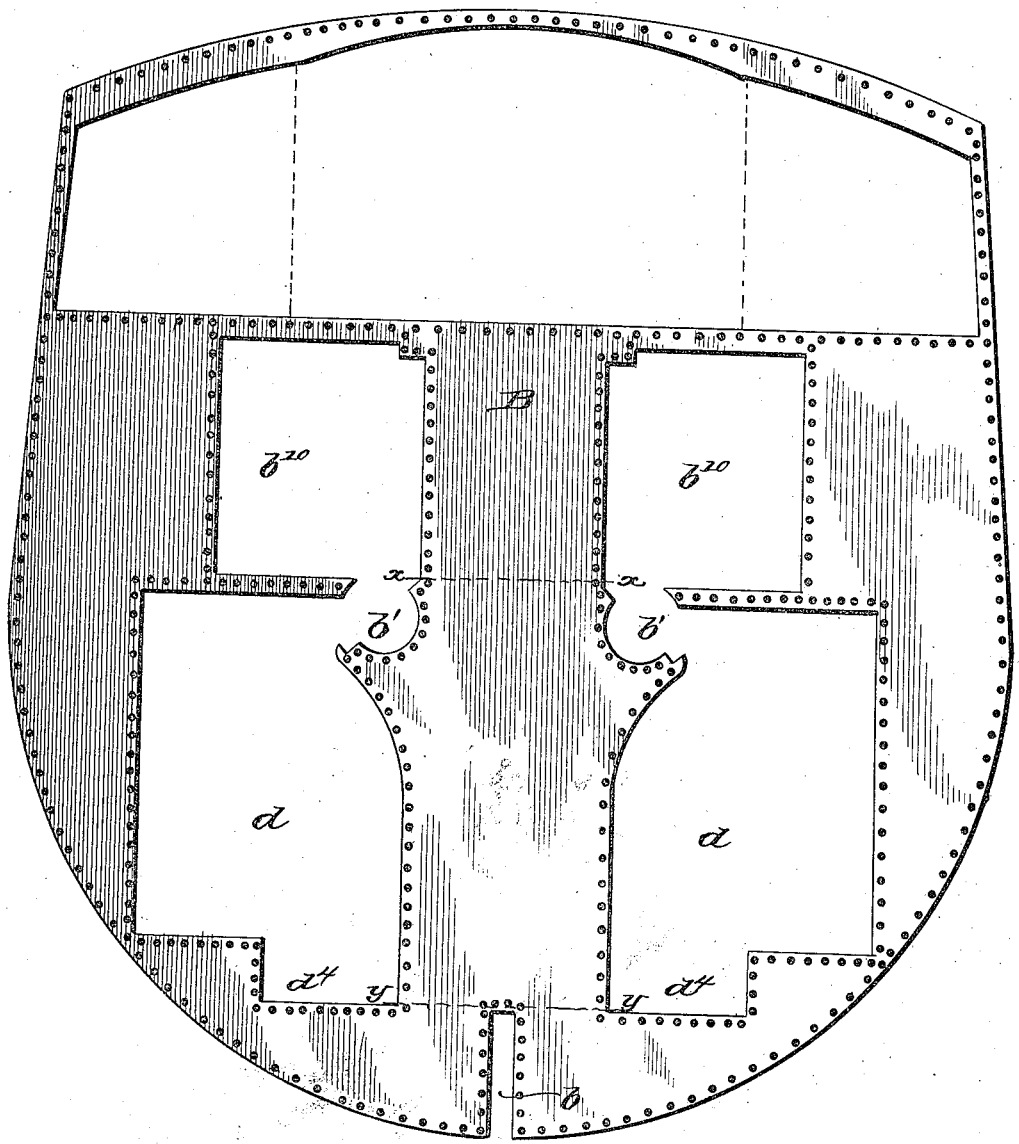

(No Model.) 15 Sheets—Sheet 5.
R. M. FRYER.
CONSTRUCTION OF SHIPS.
No. 356,065. Patented Jan. 11, 1887.
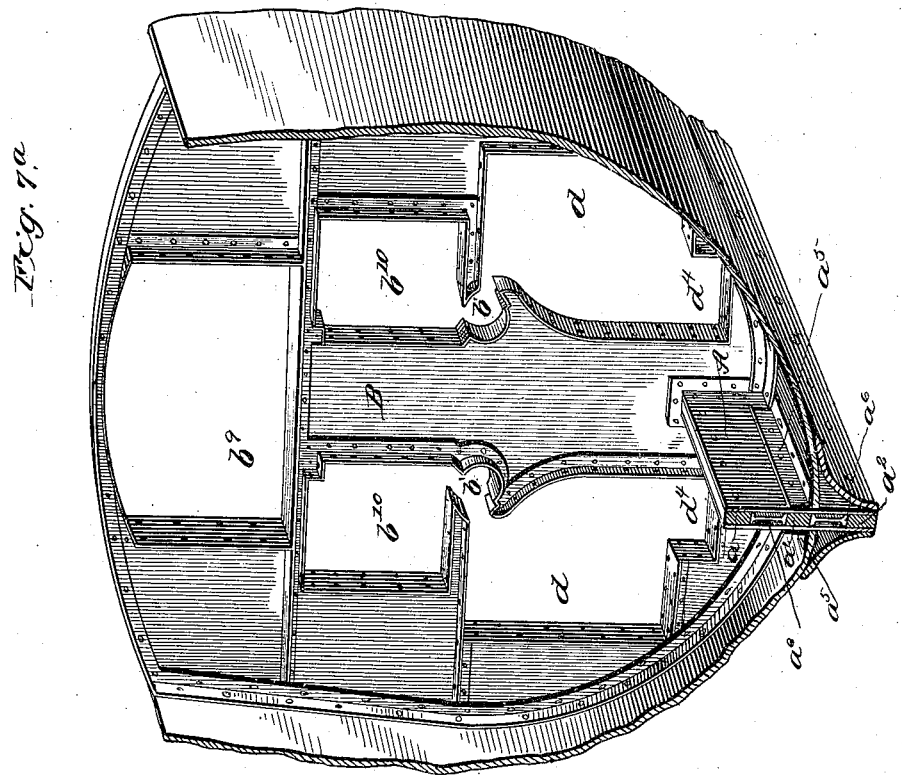

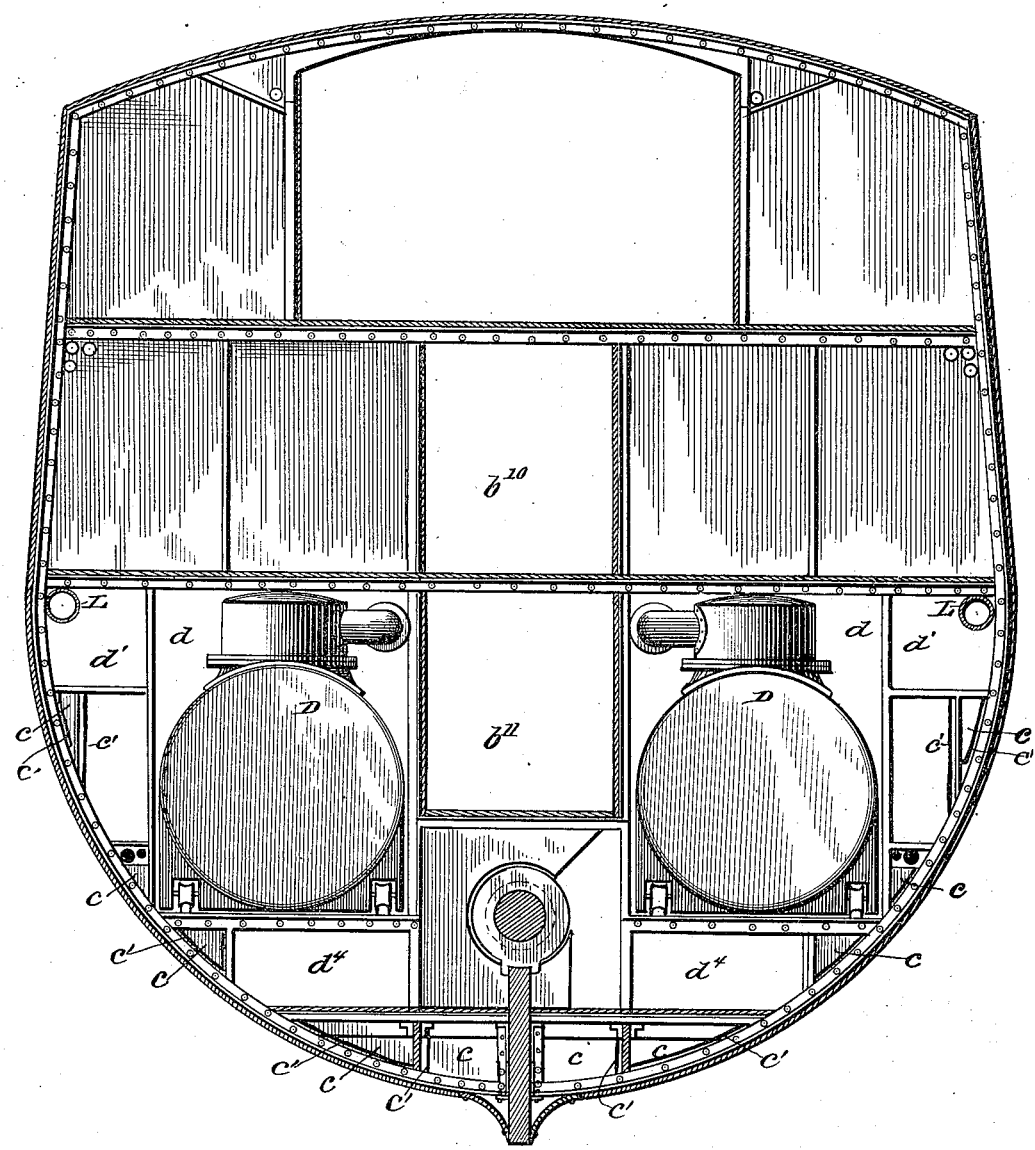

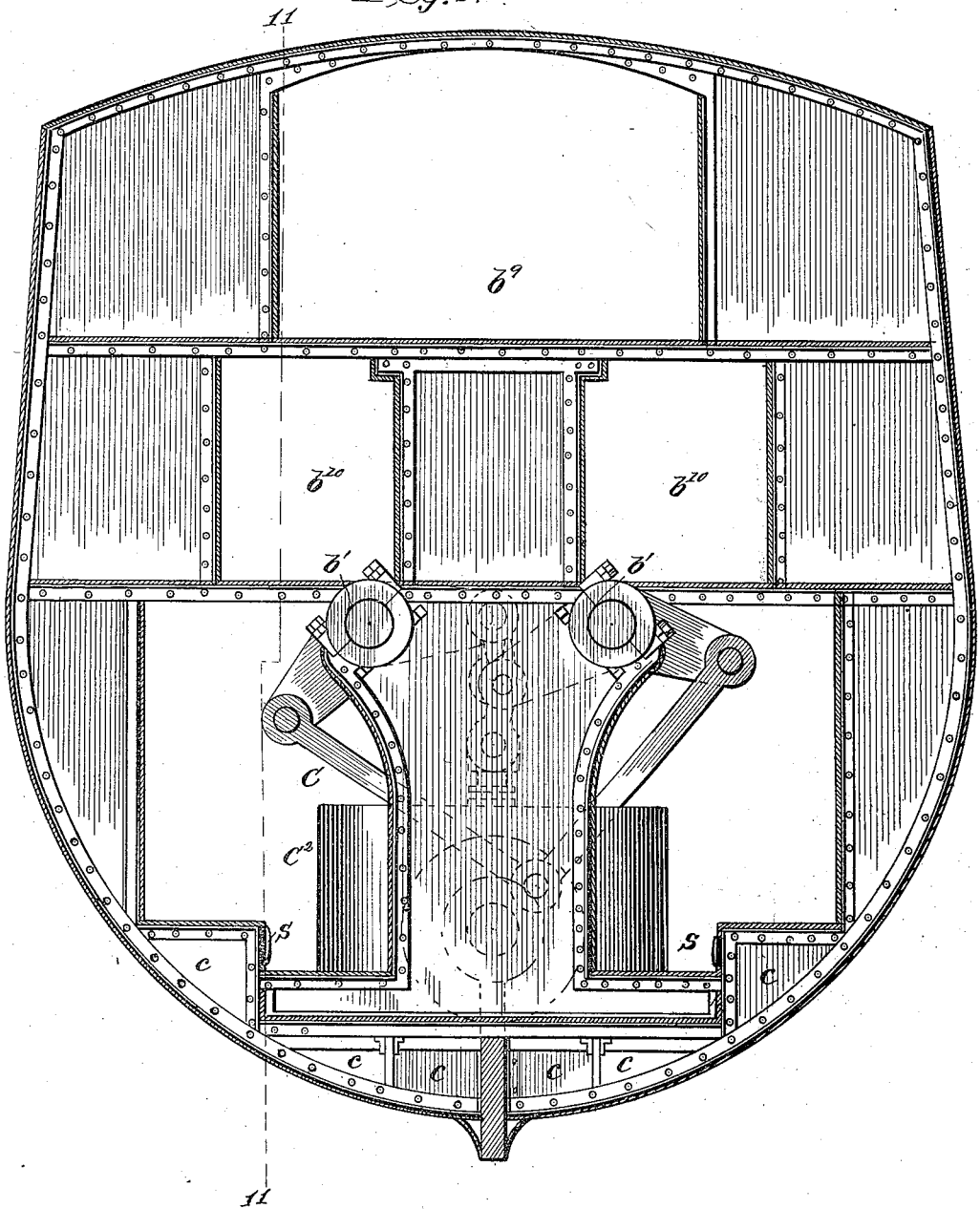

(No Model.)  
15 Sheets—Sheet 8.

R. M. FRYER.
CONSTRUCTION OF SHIPS.

No. 356,065. Patented Jan. 11, 1887.

Witnesses,  
Jos. A. Ryan  
Wm. F. Huntemann

Inventor  
Robert M. Fryer  
By D. B. Gallatin  
Attorney (No Model.)
15 Sheets—Sheet 9.
R. M. FRYER.
CONSTRUCTION OF SHIPS.
No. 356,065.  Patented Jan. 11, 1887.
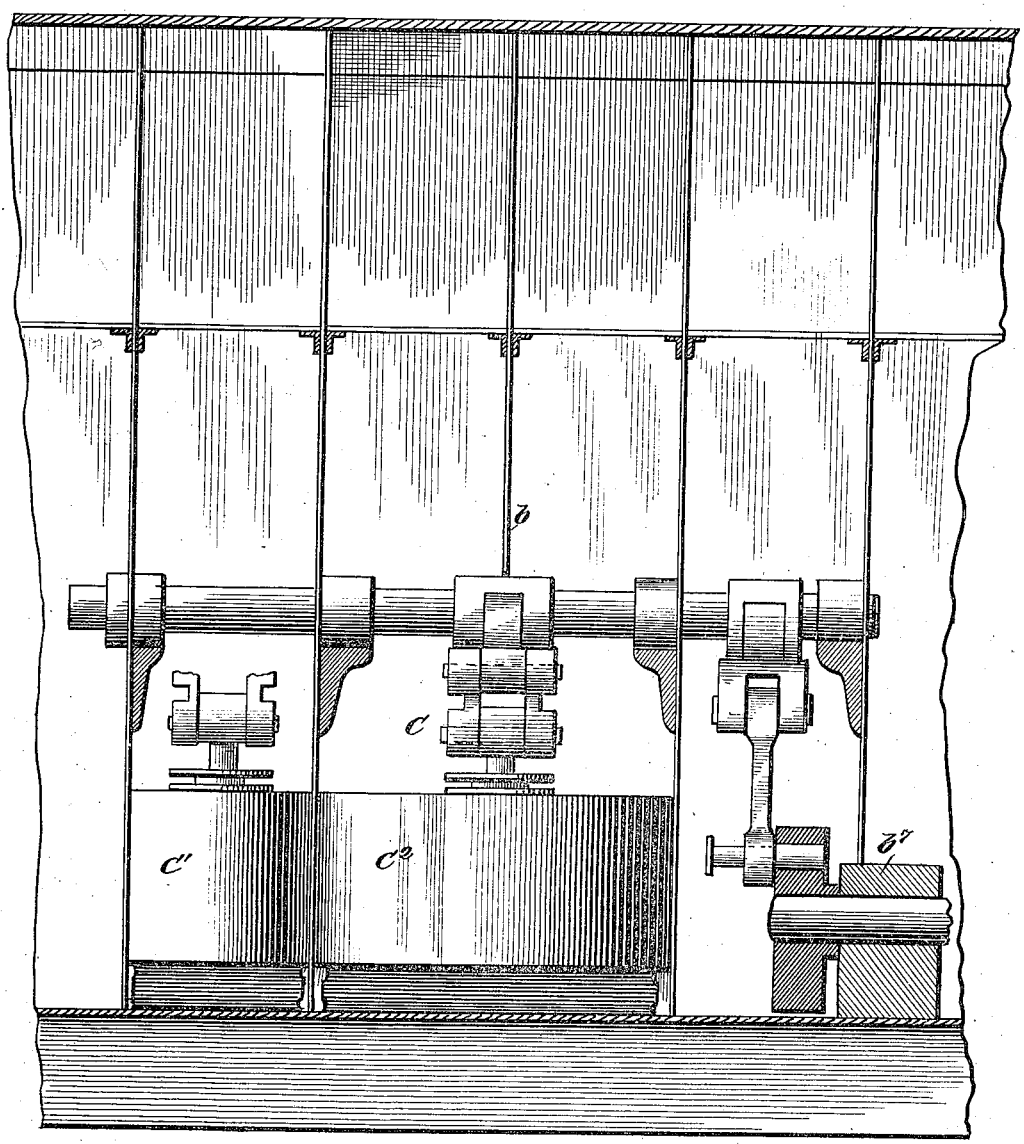

(No Model.)
15 Sheets—Sheet 10.
R. M. FRYER.
CONSTRUCTION OF SHIPS.
No. 356,065. Patented Jan. 11, 1887.
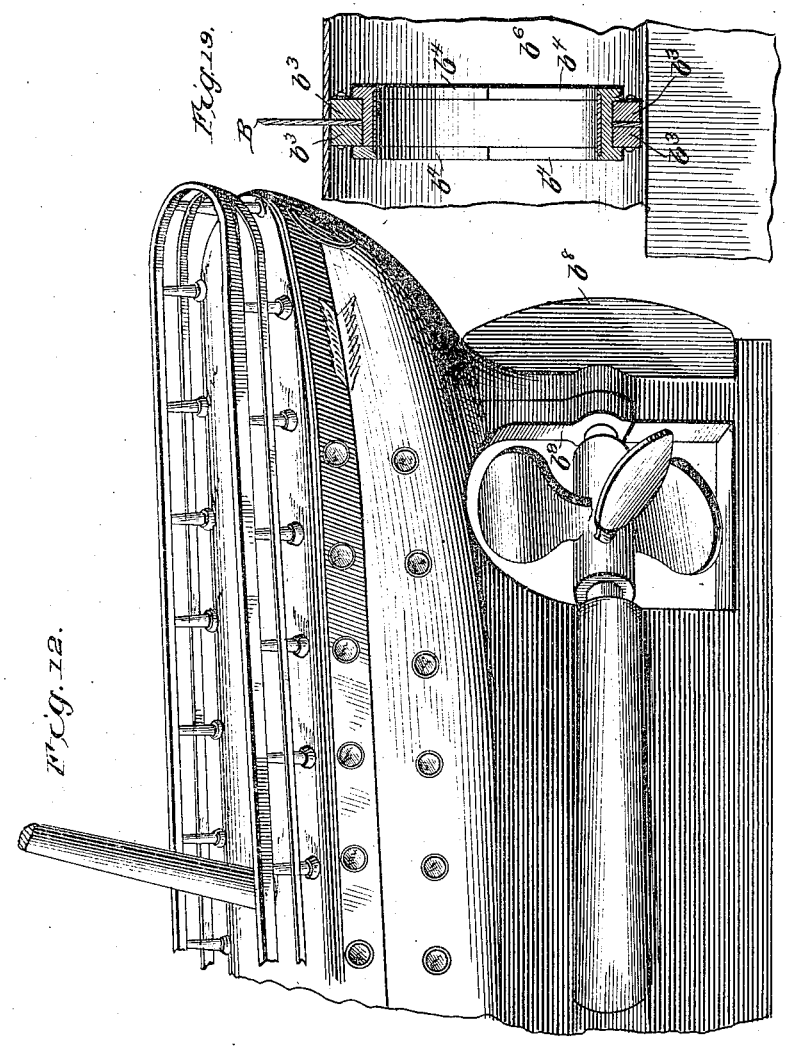
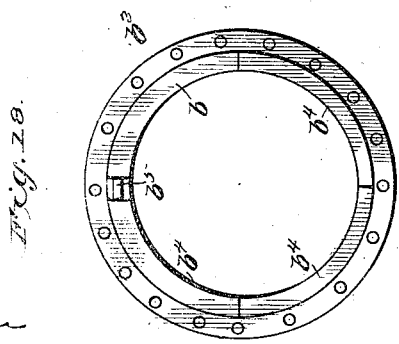
Witnesses.
Jos. A. Ryan
Wm. F. Hunteman
Robert M. Fryer
Inventor
By D. B. Gallatin
Attorney (No Model.) 15 Sheets—Sheet 11.
R. M. FRYER.
CONSTRUCTION OF SHIPS.
No. 356,065. Patented Jan. 11, 1887.
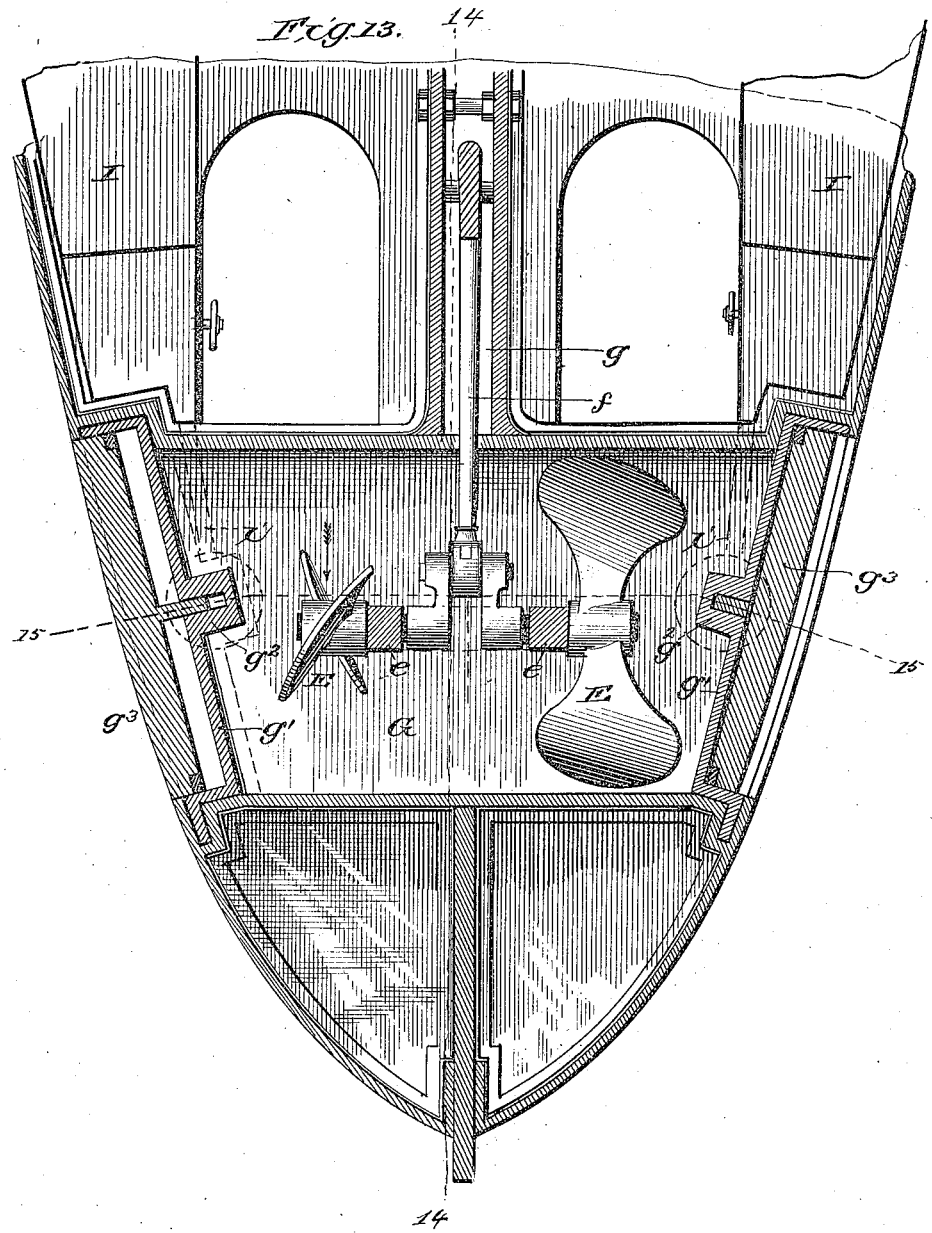
WITNESSES
Jos. A. Ryan
Wm. F. Huntemann
Robert M. Fryer
INVENTOR
By D. B. Gallatin
Attorney (No Model.) 15 Sheets—Sheet 12.

R. M. FRYER.
CONSTRUCTION OF SHIPS.

No. 356,065. Patented Jan. 11, 1887.

Witnesses:
Jos. A. Ryan
J. C. Huntemann

Robert M. Fryer
Inventor,
By D. B. Gallatin
Atty.

(No Model.)  15 Sheets—Sheet 13.
R. M. FRYER.
CONSTRUCTION OF SHIPS.
No. 356,065. Patented Jan. 11, 1887.
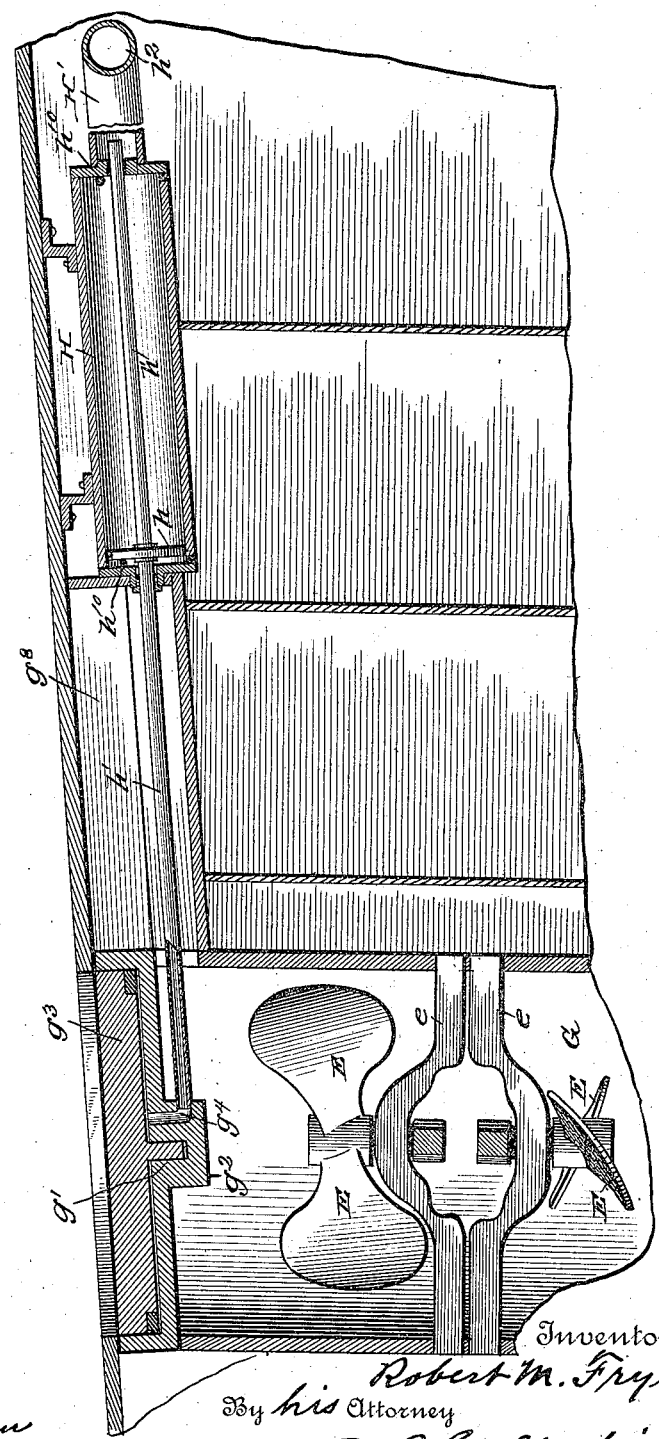
Witnesses
Jos. A. Ryan
Wm. T. Huntemann
Inventor
Robert M. Fryer
By his Attorney
D. B. Gallatin (No Model.)
15 Sheets—Sheet 14.
R. M. FRYER.
CONSTRUCTION OF SHIPS.
No. 356,065. Patented Jan. 11, 1887.
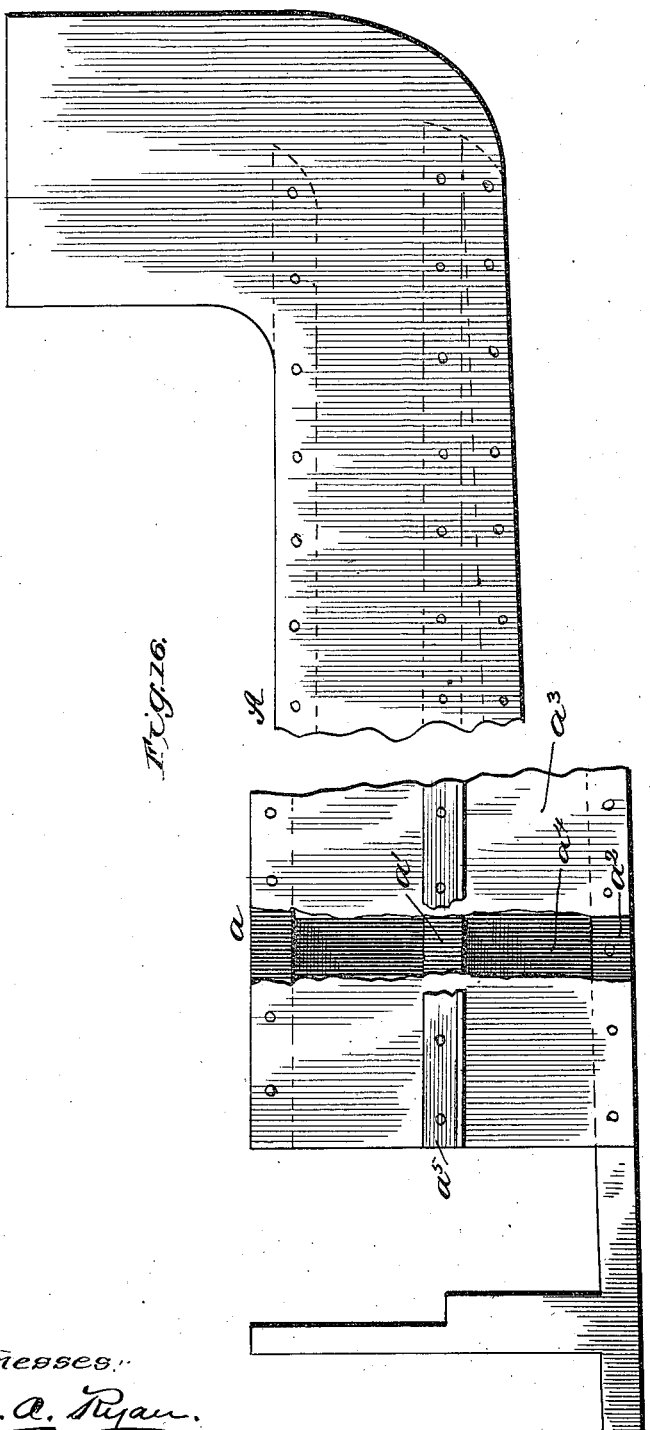
Witnesses:
Jos. A. Ryan.
Wm. F. Huntemann
Robert M. Fryer
Inventor.
By D. B. Gallatin
Atty

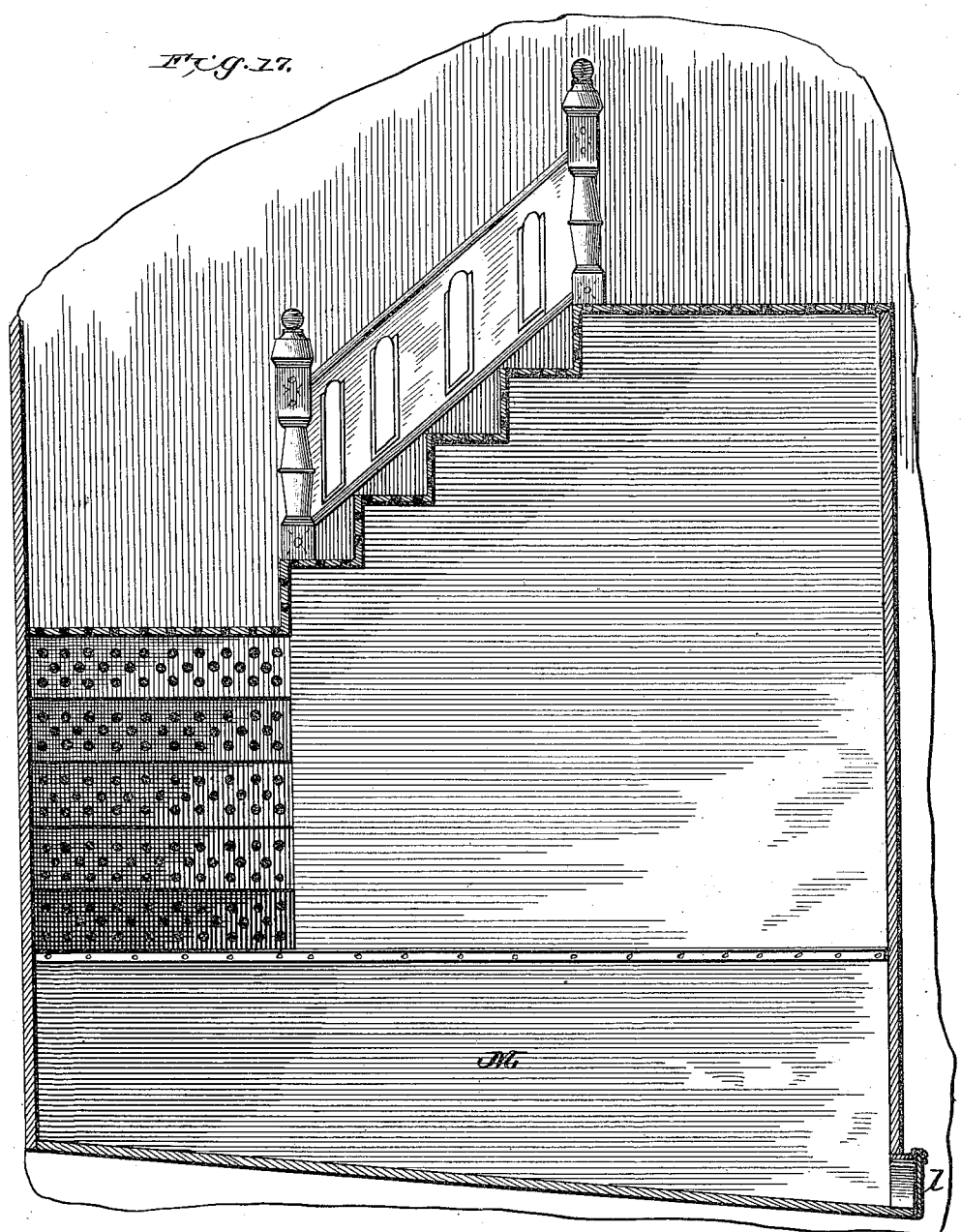

UNITED STATES PATENT OFFICE.

ROBERT M. FRYER, OF BROOKLYN, NEW YORK.

CONSTRUCTION OF SHIPS.

SPECIFICATION forming part of Letters Patent No. 356,065, dated January 11, 1887.

Application filed November 17, 1886. Serial No. 219,174. (No model.)

*To all whom it may concern:*

Be it known that I, ROBERT M. FRYER, a citizen of the United States, and a resident of the city of Brooklyn, county of Kings, and State of New York, have invented certain new and useful Improvements in the Construction of Iron Ships, of which the following is a specification.

My invention relates to the construction of iron ships, and the principal objects sought to be attained are simplicity and economy in construction; the production of a vessel which shall be absolutely fire-proof and practically non-sinkable, and which shall possess in the highest degree the requisites of solidity, rigidity, and ability to resist shocks and strains; to so dispose the weight of material, the machinery, and the necessary supplies as to make the vessel self-ballasting; to provide means for easily handling and controlling the vessel at sea and in port; and to provide for the health, convenience, comfort, and safety of both passengers and crew.

To these ends the invention consists in the construction hereinafter fully described and claimed.

Figure 14:
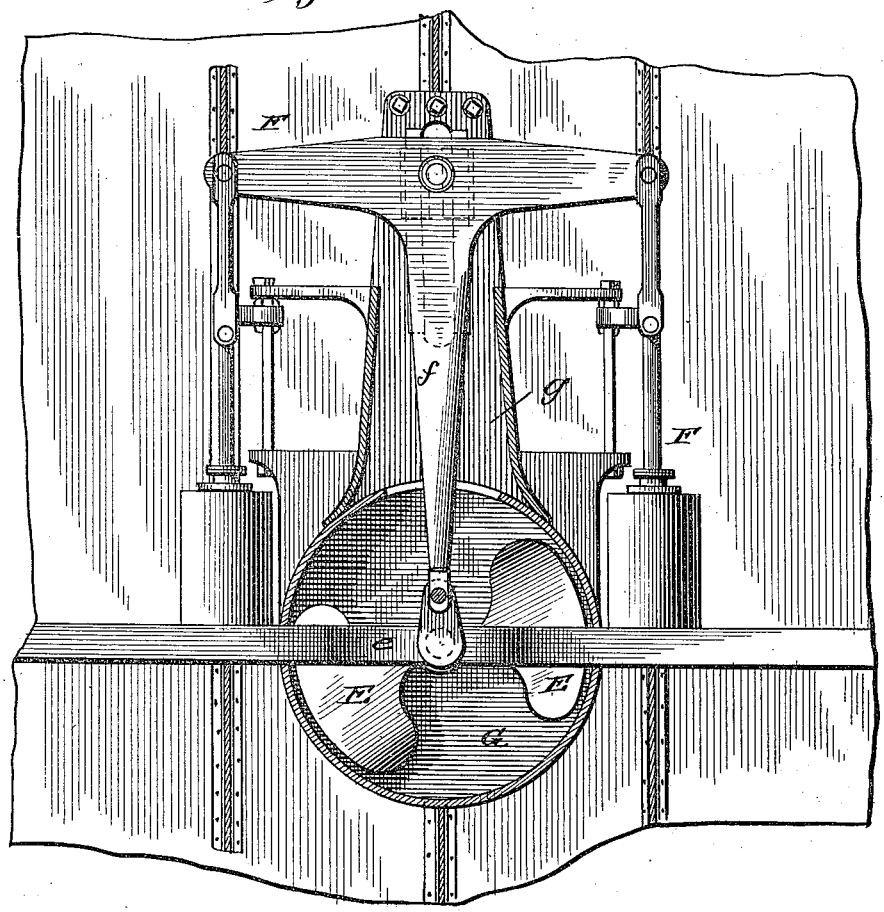

In the accompanying drawings, which form part of this specification, Figure 1 represents a perspective view of a ship constructed according to my invention, with a portion of the upper deck removed. Fig. 2 represents a central vertical longitudinal section. Fig. 3 represents a horizontal section through the main saloon immediately below the upper deck. Fig. 4 represents a similar section through the lower saloon, and Fig. 5 a similar section immediately below the lower deck. Figs. 6 and 7 represent two of the transverse plates which divide the structure into sections, and take the place of the ordinary ribs and cross-beams of vessels as heretofore constructed. Fig. 7ª represents one of the transverse plates and a portion of the outside sheathing or hull in perspective. Fig. 8 represents a transverse section through the ship in rear of the engine-room, showing two of the boilers in end elevation. Fig. 9 is a similar section taken immediately in front of the engine, and looking toward the stern. Fig. 10 represents a vertical longitudinal section through a part of the vessel, the section being taken through one of the boiler-tunnels, and showing two boilers in side elevation. Fig. 11 represents a similar section through the engine-room on the line 11 11, Fig. 9, the engine being shown in elevation, with parts broken away. Fig. 12 represents a perspective view of the stern of the vessel. Fig. 13 represents a vertical transverse section on the line 13 13, Fig. 2, looking toward the stern. Fig. 14 represents a vertical section at right angles to that shown in Fig. 13, and taken on the line 14 14. Fig. 15 represents a horizontal section taken on the plane of the line 15 15, Figs. 2 and 13. Fig. 16 represents the keel of the vessel in side elevation, the central portion and one of the side plates being broken away. Fig. 17 represents a vertical section through one of the stairways; and Figs. 18 and 19 represent, respectively in elevation and in section, one of the bearings of the shaft of the vessel, the latter figure showing also a portion of the casing or tube which surrounds the shaft.

With the exception of the keel and the bearings and fittings of the shaft and engine, the entire structure which forms the subject of this invention is formed of rolled plate iron or steel, which is the simplest product of the rolling-mill, and which is produced by the ordinary rolls with which every mill is provided, thus avoiding the use of special machinery for the production of any part of the hull or frame of the vessel, and even the keel may be made entirely of metal plates, as will be hereinafter explained.

Instead of the ordinary ribs of iron vessels, as heretofore constructed, I employ iron plates, which are erected on and secured to the keel, and which correspond in size and shape with the cross-section of the vessel at the points at which they are erected. These plates are erected at intervals which correspond with the length of the state-rooms or other compartments into which the vessel is to be divided, and form the partitions or walls between such rooms or compartments, thus effectually separating the latter. The plates are cut out to form the various passages and longitudinal compartments which extend entirely or partially through the vessel. The walls of these passages or compartments are formed of iron plates which extend throughout their length, and are secured to the edges of the openings, thus connecting all the plates through which the passages or compartments extend.

The decks are composed of iron plates of sufficient thickness to give the required strength. The upper deck rests upon the tops of the iron plates, which I denominate "section-plates," and are secured to all of them. The other decks are composed of plates of sufficient length to extend entirely across the vessel, and of a width to fill the spaces between the section-plates. They rest upon and are secured to angle-irons which are riveted to the plates.

Inasmuch as the plates which take the place of the ordinary ribs extend entirely across the vessel, it follows that any shock, strain, or pressure to which the vessel may be subjected will be resisted by the entire plate, and that one side cannot be stove in without displacing the whole plate and breaking the opposite side of the vessel out; nor can the vessel be collapsed except by the application of pressure sufficient to double up the plates between the points between which it is applied; but the plates being all connected by the decks and the walls of all the various passages and compartments, this doubling up or bending is resisted by all the plates throughout the vessel, so that any crushing force applied at any point is taken up and resisted by the whole structure.

The interior of the vessel, outside of the various passages and occupied apartments, is divided into a great number of air and water tight compartments; and even the passages and occupied apartments are provided with doors which are fitted to close air and water tight, so that in case of accident—such as the breaking of one or more holes through the hull—the injured section of the vessel can be entirely and completely shut off from the uninjured parts, so that water can only enter into the compartment or compartments broken into, whereby the buoyancy of the vessel will not be materially impaired.

It has been asserted, and undoubtedly with truth, that the breaking of propeller-shafts, which is a frequent occurrence, is due not alone to torsional strain, but to the combined torsional and lateral strain which results from what may be termed the "flexibility" of the vessel.

Now, in order to guard against shaft-breaking, it becomes necessary to stiffen and strengthen the hull sufficiently to remove or overcome this flexibility; and this is one of the objects of my invention, which I claim to have accomplished in the construction hereinafter more minutely described.

By my construction I am enabled to place the engine, the boilers, and other machinery nearer the bottom of the vessel, where they will serve as ballast, thus avoiding at least the use of the ballast necessary to balance these parts when placed in the upper part of the vessel, and to that extent saving room for more valuable cargo.

In carrying out my invention I first construct the keel, which is shown in Fig. 16, and is designated by the letter A. It is formed of a series (preferably three) of longitudinal bars or ribs, $a$ $a'$ $a^2$, and two side plates, $a^3$ $a^4$, the whole bolted or riveted together, as indicated in the drawings. The ribs $a$ $a'$ $a^2$ may be made of solid bars, or of plates of iron placed together flatwise and riveted. It being impracticable to make the bars and plates integral through their length, they are made in convenient sections, which are bolted or riveted together, the joints being so disposed as to "break" or "lap" each other. The keel tapers throughout its length, being nearly twice as wide at the stern as at the bow. The bars $a$ $a^2$ are flush with the upper and lower edges, respectively, and the bar $a'$ is disposed between the two, running parallel with the bar $a$ and joining the bar $a^2$ at its front end.

In order to still further strengthen the keel in its vertical plane, iron-girders or I beams $a^6$ are placed between the bars $a$ $a'$ $a^2$, as represented in Fig. 7$^a$, the lower ones being tapered to adapt them to the space between the bars $a'$ $a^2$. Along the sides of the keel opposite the bar $a'$ are longitudinal angle-bars $a^5$, which are secured in place by bolts or rivets passing entirely through all the parts. The purpose of these angle-bars will be hereinafter indicated. On this keel are erected, at suitable intervals—say of seven and a half feet—what I denominate "section-plates." (Shown in elevation in Figs. 6 and 7, and in perspective in Fig. 7$^a$, and marked B in all the figures.) These are made from plate-iron of suitable thickness and strength, and of a size and shape to correspond with the cross-section of the ship at the points at which they are placed. These plates are formed in sections and riveted together, so as to form practically a single continuous plate. They are cut out, as indicated in the drawings, to form the required compartments of and passages through the ship, and are notched at the bottom, as shown at $b$, to receive or set over the keel, the notches $b$ being of a depth to permit the plates to rest on the flanged bars $a^5$.

Around the outside edges of the plates B and around the openings therein are riveted angle-irons, to which in turn are riveted the outside sheathing which constitutes the hull of the vessel, and the plates which form the walls of the various passages and compartments. The angle-iron which surrounds the notch $b$ is riveted or bolted to the keel, and forms the fastening which fastens the keel and the plates B together. Similar angle-irons also extend transversely across the plates to support the lower decks, these latter also being securely riveted. Thus all the parts of the structure thus far described are securely fastened together, and each forms a brace or stay to support the adjacent or contiguous parts, forming a substantial structure capable of withstanding and resisting strain from all directions.

The section-plates B, which occupy the central or engine section of the vessel, are cut out, as shown in Figs. 6, 7, 7ª, and 9.

The opening $b^9$ represents the main saloon, which extends through the entire length of the vessel, as represented in Fig. 3.

The openings $b^{10}$ represent the lower saloon, which is divided through the engine-section of the vessel by the central portion of the plates B, which constitute the frame of the engine, but which forward and aft of the engine-section occupies a central position directly under the main saloon, the plates, except those which form the frame of the engine, being cut out centrally, as represented in Fig. 8.

The openings $d$ forward and aft of the engine-section form the tunnels in which the boilers are located; but in the engine-section they form a part of the engine-room, which extends entirely across. The lower portions, $d^4$, of the openings $d$ form the ash-tunnels which receive the ashes from the furnaces.

The opening $b^2$, Fig. 6, forms a passage for the propeller-shaft from the engine-room to the stern, and forward of the engine-room forms a tunnel or passage-way.

The upper side portions of the plates B form the partitions between the state-rooms, the length of which is regulated by the distance the plates are placed apart. The dividing-walls between the state-rooms and the saloons are formed of iron plates, which are riveted to the flanges surrounding the openings in the plates B.

Any or all of the partitions between the state-rooms may be cut out in order to connect two or more rooms, and, if provided with doors, the rooms may be separated or thrown into communication at pleasure.

The lower part of the ship is divided into numerous air-tight compartments, as shown in Figs. 8 and 9, where they are designated by the letter $c$. These compartments are all to be connected with an air-forcing apparatus, (not shown,) which is to be operated by the engine, and are to be filled with compressed air under a pressure as great or greater than that of the water against the outside of the vessel, in order that if a hole be broken into any compartment through the side or shell of the vessel water may be prevented from entering.

Of course if the opening be formed at or near the top of any compartment the contained air, by reason of its being lighter than water, would, in the absence of any provision against such a contingency, escape, and water would enter to the height of the opening; but in order to guard against this each compartment is divided by a diaphragm or partition, $c'$, arranged in the plane of the outside shell and a short distance from the latter, such diaphragm or partition being connected at the top and sides with the walls of the compartment, and wholly or partially disconnected at the bottom. Thus if an opening be formed at the top only the space between the diaphragm and the hull of the vessel can fill with water, the air in the inner division of the compartment being prevented from escaping by the weight and pressure of the water in the outer division, and the water being prevented by the pressure of the air from entering.

Each compartment $c$ has an opening through its inner wall, through which entrance may be effected from the passages or occupied apartments when desired, and these openings are all provided with doors or man-hole covers S, adapted to be closed air and water tight.

I propose to use in this vessel the engine patented to me by Letters Patent of the United States, dated August 21, 1883, and numbered 283,704, which is admirably adapted to this purpose. This engine, which in the drawings is marked C, is located amidships in the bottom of the vessel, and rests on the keel. The bearings for its shaft are formed in or attached to the plates B, as indicated at $b'$, thus in reality making the engine a part of the ship. The engine is of the compound type, being composed of a high-pressure cylinder, C', and a low-pressure cylinder, $C^2$. These are so proportioned that the first occupies and fills the space between two of the division-plates B, and the latter a double space, for the accommodation of which that part of the intermediate plate between the dotted lines $x y$, Fig. 7, is cut out, as indicated in Fig. 11. The entire engine being thus confined to the bottom of the vessel, not only serves as ballast, but displaces the ballast necessary to balance the cylinders and connections when the latter are located in the upper part of the vessel. The boilers D are also located in the bottom of the vessel in tunnels or passages $d$ at either side of the keel.

In Fig. 5 I show twenty boilers arranged in pairs forward and back of the engine-room. The boilers may thus be said to be arranged in four groups—two forward of the engine-room and two back of the same.

The furnaces are connected by flues $d^6$ with horizontal flues $d'$ at the sides of the vessel, which flues $d'$ connect with the stacks, six of which are shown in Fig. 1—three at either side of the vessel. By means of valves or dampers suitably disposed in the flues $d'$ any one or more of the furnaces may be cut off when not in use.

The boilers and furnaces adjacent to the engine-room are sufficiently removed from the latter to form fire-rooms $d^2$, and the pairs of boilers and furnaces are sufficiently separated to form similar rooms between the same.

In order to provide for the comfort of the firemen, a shield, $d^3$, is placed in front of each boiler, a short distance therefrom, the top of the furnace and the grate extending to said shield, the latter having an opening through which the furnace is fed, the furnace-doors being arranged to close said opening. The shield $d^3$ extends from the floor to within a short distance of the top of the room, and entirely across the latter, the air to support combustion being drawn over the top of the shield and down behind the latter to the mouth of the furnace. Thus when the furnace-doors are closed the only heat that can enter the fire-room is that thrown off by radiation from the shield $d^3$, and this is immediately drawn off to supply the furnace, its place being taken by a fresh supply, which is admitted through a flue or opening at any convenient part of the room.

Below the boiler-tunnels are longitudinal tunnels $d^4$, into which the ashes from the furnaces are discharged through openings $d^5$, and from which they are removed by any suitable machinery.

The boilers are mounted upon trucks which run on tracks in the boiler-tunnels. This is for the purpose of facilitating the removal of the boilers when for any reason it is desired to shift them or take them out of the tunnels.

In order to provide for the removal of the boilers from or their introduction into the vessel, suitable hatchways are formed, preferably above the engine-room. Then by breaking the connections the boilers may be run along on their tracks until the one which is to be removed is brought into proper position in the engine room, when it is hoisted through the hatchway to the deck.

In order to provide for the shifting and removal of the boilers, the domes of the latter are made separable, so that the connections may be broken by simply disconnecting them from the boilers. When the latter are removed, the domes are left in position, and when the boilers are replaced are again attached.

Making the domes of the boilers separable I believe to be a novel feature, which I reserve for another application, it being referred to here simply to show how the boilers may be separated from their connections preparatory to their removal from the vessel.

The opening $b^{11}$ represents the coal-bunkers, which are located between the boiler-tunnels forward and aft of the engine-room, as shown in Figs. 2 and 5. The floors of these bunkers are somewhat higher than the floors of the boiler-tunnels, and their inner walls have openings $b^{12}$, through which the coal-tender passes the coal into the fire room. The openings are provided with doors, which may be tightly closed.

The shaft of the vessel passes through the openings $b^2$ in the section-plates B, immediately above the keel. These openings are large enough to permit the shaft to be passed in freely from the stern. The boxes or bearings for the shaft are attached to the plates B, and these latter resting upon the keel give to the shaft throughout its length a firm support. The bearings consist of, first, heavy iron rings $b^3$ $b^3$, riveted or bolted to the plates on opposite sides, and, second, the boxes proper, which are placed within the rings $b^3$. These boxes are formed of segmental parts $b^4$, which are grooved on their outer surfaces, so as to fit within and overlap the rings $b^3$, as shown in section in Fig. 19. They are also channeled on the inner faces to receive and hold Babbitt metal, to form anti-friction bearing-surfaces, as usual in shaft or journal bearings.

The segmental sections are made thinner toward their lower ends, so as to make the bearing-surface eccentric to the inner circumference of the supporting-rings $b^3$, as shown in Fig. 18, and when in position do not entirely surround the shaft. This is for the purpose of permitting them to be accurately adjusted to the shaft in the event of the rings $b^3$ not being exactly in line. The adjustment is effected by driving wedges $b^5$ between one or more of the joints. A tube, $b^6$, surrounds the shaft between the thrust-bearing, (not shown,) which is located near the main bearing $b^7$, at the inner end of the shaft, and the outer bearing adjacent to the screw. This tube $b^6$ is formed in sections, which fit between the section-plates B and upon the rings $b^3$, the joints being securely packed to prevent the escape of the oil, or oil and water, which the tube is designed to contain as a lubricant for the shaft-bearings.

The end of the shaft back of the screw is supported by a hanger, $b^8$, which contains an adjustable box, such as above described. This hanger depends from the stern of the vessel, and is entirely disconnected from the keel and the rudder-stanchion, so that if these parts be injured or entirely broken away the support for the end of the shaft may be left intact.

In the bow of the vessel is a transverse passage, G, opening through both sides of the vessel, in which is located one or more screws, by which the bow may be thrown around in either direction, and which may be used as an auxiliary steering apparatus, or in the event of the rudder's being disabled or carried away may take its place altogether. This screw, which in the drawings is marked E, is driven by a separate engine, F, of the character of that for which Letters Patent of the United States were granted to me on the 19th day of March, 1872, and numbered 124,805. This engine is connected with the boilers D, by which the main engine of the vessel is driven. An arm, $f$, of the engine works through an opening in the top of the passage G, and is connected with the crank of the shaft which carries the screw or screws E. The shaft is supported by transverse bars $e$ $e$, between which the crank works.

Water is prevented from entering the vessel through the opening through which the arm $f$ works by a vertical tube, $g$, which rises from the tube which forms the transverse passage G, which tube $g$ extends above the water-line of the vessel.

The screw E, when used in the larger class of vessels, must necessarily be quite large— say ten feet in diameter—in order to exert the requisite force, and it is evident that an opening to accommodate such a screw would materially retard the progress of the vessel by offering a large resisting-surface, and I therefore provide sliding gates $g'$, by which the ends of the passage G may be closed when the screw E is not in use. These gates are operated and moved by hydraulic pressure, as follows:

Within the vessel, and a sufficient distance back from the opening G, are cylinders H, (one at each side,) the pistons $h$ of which are connected by piston-rods $h'$ with bosses or projections $g^2$ on the inner faces of the gates $g'$, and between the mouths of the passage G and the cylinders H are chambers $g^8$, into which the gates $g'$ are drawn to open the passage G. In the upper part of the vessel, at a sufficient elevation to give the requisite pressure, are tanks or reservoirs I, for containing water, which tanks are connected by suitable pipes or passages, $i$, (shown in Fig. 13,) with the cylinders H. The gates $g'$ being closed, and it being desired to open them, water is admitted from the tanks I to the cylinders H, in front of their pistons $h$, when the latter are moved back, drawing the gates into their chambers $g^8$. The reverse movement to close the gates is effected by cutting off the water from the front of the cylinder and admitting it through another pipe in rear of the piston $h$. The cylinder is provided at each end with an outlet, $h^{10}$, through which the water admitted to move the piston in one direction escapes as the piston is moved in the opposite direction by a fresh supply admitted at the other end.

It is of course to be understood that both the outlet and inlet pipes are provided with suitable cocks by which the water may be turned on or off at pleasure.

The gates $g'$ are recessed on their outer faces to receive movable disks $g^3$, which fit the openings in the hull of the vessel, and which are adapted to be moved out into said openings to bring their outer faces flush with the hull, to form a smooth exterior. They are also operated by hydraulic pressure, which is applied through the following instrumentalities: The piston-rods $h'$, which are connected with the sliding gates $g'$, are hollow, and communicate, through openings or passages $g^4$, with the chamber of the gates $g'$. They extend, when the gates are closed, entirely through the cylinders H into chambers H' in rear of the cylinders H, which chambers H' are of sufficient length to receive the portions of the piston-rods in rear of the pistons $h$. The reservoirs I, or other similar reservoirs above the water-line, are connected with the chambers H' by suitable pipes or passages, $h^2$, also provided with stop-cocks. When the latter are opened, water is admitted, through the piston-rods $h'$, to the chambers of the gates $g'$ in rear of the movable plates $g^3$, and the pressure of the water thus applied being greater than the pressure of the water against the outside the plates will be forced out into the openings in the hull, and the latter will be closed, forming a smooth exterior surface, as above explained.

When it is desired to open the gates, the reservoirs are cut off by turning the cocks in the connecting-pipes, and the water in rear of the plates $g^3$ is allowed to escape through suitable outlets, when the pressure of water against the outer faces of the plates $g$ will force them back into their chambers in the gates, when the latter are free to be moved back, as above explained.

In the stern of the vessel I form a chamber, K, which extends entirely across, and has openings K' through the sides of the vessel, immediately above the water-line. The walls of this chamber are connected at their ends to the sides of the vessel, and intermediately are supported by the section-plates B, which divide the vessel transversely, thus making the walls of the chamber an integral part of the vessel. This chamber is for the reception of a life or other boat or boats, which are carried therein till required, when they are discharged through the side openings. Access may be had to this chamber from the interior of the vessel, and the occupants may enter the boats before they are launched, thus insuring both safety and comfort.

In order that the state-rooms, any or all, may be provided with closets, urinals, and permanent wash-stands, I provide sewer or outlet pipes L, with which these fixtures may be connected. These pipes I preferably locate at the sides of the vessel, running them through the flues $d'$, as shown in Fig. 8, where they will be entirely out of the way. They are open at both ends, so that when the vessel is in motion a current will be induced through them, which will carry off deposits and keep them clear and clean.

In order to prevent the flooding of the saloons in the event of a sea breaking over the vessel while the hatches are open, the stairs which connect the several decks are thickly perforated, as represented in Fig. 17, to allow the water to run through, and under each stairway is a tank, M, which receives the water as it runs through the perforations, and from which it may be pumped or discharged through a valved outlet, $l$, which leads through the side of the vessel.

All the doors of the various apartments and compartments are to be fitted to close air-and water tight, so that any part of the vessel may be effectually cut off and separated in case of accident or necessity. Thus in case of injury to the hull the injured part may be separated from the remainder of the vessel; or, in the event of fire breaking out within the vessel, by closing the doors of the apartment in which it originates, it may be confined to such apartment and extinguished by the introduction, through suitable pipes, with which the vessel is fitted, of carbon deoxide or other non-inflammable gases.

In practice I intend to fit each state-room with double doors, one of which is to be hung on hinges, as usual, and the other of which will be arranged to slide in a frame, (see Fig. 10,) and will be fitted with rubber or leather gaskets, to adapt it to be closed air-tight in case of emergency. These sliding doors, which in the drawings are marked $o$, are to be made of steel, so as to possess sufficient strength with the least possible weight to resist the pressure of the air when the state-rooms are charged with compressed air, as before set forth; and the windows are to be fitted with similar sliding doors or plates, by which they may be closed and hermetically sealed, when necessary.

The construction hereinbefore described adapts the vessel to be supplied with inside armor, which may be placed in the state-rooms or other compartments, to protect the whole or any part of the vessel. By placing the armor within the vessel, instead of on the outside, as heretofore, the exterior lines are preserved and the sailing qualities of the vessel are not impaired, which I regard as a matter of the greatest importance, since it permits the vessel to be converted into an armored ship in much less time and at much less expense than by the old method. Moreover, the armor, to adapt it to be placed within the state-rooms or other compartments, must necessarily be made in comparatively small parts, whereby it is adapted to be conveniently handled and shipped to the place where it is to be applied to the vessel. The details of construction and the manner of applying this armor I reserve for another application, which I intend to file, the matter being referred to here merely to show the adaptation of a vessel constructed according to my plan to be converted from a passenger or freight vessel to an armored ship capable of resisting the engines of warfare.

Having thus described my invention, I claim as new—

1. A vessel constructed, as herein described, with transverse plates arranged at intervals and corresponding in size and shape with the cross-section of the vessel at the points at which they are placed, and extending entirely across and supporting both sides of the hull and the decks.

2. A vessel constructed, as herein described, with transverse plates arranged at intervals and corresponding in size and shape with the cross-section of the vessel at the points at which they are placed, and extending entirely across and supporting both sides of the hull, and having openings to form longitudinal compartments and passages through the vessel, said transverse plates being connected by the walls of said longitudinal compartments and passages.

3. A vessel constructed, as herein described, with transverse plates arranged at intervals and corresponding in size and shape with the cross-section of the vessel at the points at which they are placed, and having openings to form longitudinal compartments and passages through the vessel, and having flanges or angle-irons around their edges and around said openings, to which the hull and the walls of the compartments are attached, substantially as described.

4. The keel constructed of side plates, $a^3$ $a^4$, and a series of longitudinal bars arranged between said plates, the whole secured together by bolts or rivets extending through plates and bars, as shown and described.

5. The combination, with the keel A, of a series of transverse section-plates, B, notched at $b$ to receive the keel, and erected upon the latter at intervals and secured thereto, as shown and described.

6. The combination, with the keel A, of the transverse section-plates B, erected thereon at intervals and secured thereto, the shaft-bearings secured to said plates opposite openings in the same, and the shaft working in said bearings, substantially as and for the purpose described.

7. The combination, with the keel A, of a series of transverse plates, B, of a size and shape to correspond with the cross-section of the vessel at the points at which they are placed, the decks supported upon and between said plates, and the hull or shell of the vessel secured to the edges of said plates, substantially as shown and described.

8. The combination of the transverse section-plates B, arranged at intervals and perforated for the passage of the shaft of the vessel, the shaft-bearings attached to the plates opposite the perforations, and the sectional tube which surrounds the shaft, the sections of said tube being arranged between the transverse section-plates and supported by the shaft-bearings, substantially as described.

9. A vessel constructed, as herein described, with transverse section-plates erected on and secured to the keel at intervals, said plates corresponding in size and shape with the cross-section of the vessel at the points at which they are placed, and having openings near the bottom on opposite sides of the keel to form tunnels for the boilers, and other openings above the keel and between the first-mentioned openings to form coal-bunkers between the boiler-tunnels, the walls of said tunnels and bunkers being attached to the section-plates, substantially as shown and described.

10. A vessel constructed, as herein described, with transverse section-plates erected on and secured to the keel at intervals, said plates corresponding in size and shape with the cross-section of the vessel at the points at which they are placed, several of the plates in the midship section being cut out centrally at the bottom to form an engine-room, and the plates forward and back of the engine-room having openings near the bottom on opposite sides of the keel to form boiler-tunnels, and other openings above the keel to form coal-bunkers between the boiler-tunnels, the walls of said engine-room, boiler-tunnels, and coal-bunkers being attached to the plates through which they pass, substantially as and for the purpose described.

11. As a means for preserving approximately a normal temperature in the fire-rooms, the shields $d^3$, erected in front of the boilers and furnaces and extending entirely across said rooms, and from the floor to within a short distance of the top of the rooms, substantially as shown and described.

12. The combination and arrangement, substantially as described, of the boiler and its furnace, a shield, $d^3$, which extends across and entirely separates the fire-room from the boiler and furnace, except at the top, an ash-tunnel, $d^4$, below the furnace, and openings into said ash-tunnel back of the shield $d^3$, substantially as shown and described.

13. The combination, with the keel which supports the rudder and rudder-stanchion, of the transverse section-plates B, which are erected on the keel and carry the bearings for the body of the shaft, and the hanger $b^8$, which receives and supports the end of the shaft, the said hanger depending from the stern of the vessel and being entirely independent of the rudder-stanchion and keel, substantially as and for the purpose described.

14. The combination, with the plates B, cut out, as shown and described, to form a passage for the propeller-shaft, of the rings $b^3 \ b^3$, secured to said plates around said openings, and the sectional boxes $b^4$, arranged within said rings and having their bearing-surface eccentric to the rings, as and for the purpose described.

15. The transverse passage G through the vessel, the screw E located therein, and the sliding gates $g'$, working through openings in the walls of the passage, near its ends, to open and close said passage, the said gates carrying movable disks $g^3$, which, when the gates are closed, are adapted to be moved outward into the plane of the hull to form a smooth exterior, substantially as shown and described.

16. The combination, with the tube which forms the transverse passage G, of the sliding gates $g' \ g^3$, cylinders H, fitted with pistons $h$, which are connected with the sliding gates, water-tanks above the water-line of the vessel, and connections between said tanks and the cylinders H, through which water may be admitted from said tanks to said cylinders to move the pistons to open and close the gates, as and for the purpose set forth.

17. The combination, with the transverse tube which forms the opening G, of the chambered sliding gates $g'$, carrying movable disks $g^3$, which fit the openings in the sides of the vessel, water-tanks located above the water-line, and pipes or passages connecting the tanks with the chambers of the gates $g'$, whereby water may be admitted to said chambers behind the disks to force the latter out into the openings in the hull, as and for the purpose described.

18. The combination, with the tube which forms the transverse passage G, of the chambered sliding gates $g'$, carrying movable disks $g^3$, cylinders H, fitted with pistons $h$, which are connected with the gates $g'$ by hollow piston-rods $h'$, chambers H' in line with the cylinders H, into which the piston-rods $h'$ extend, tanks located above the water-line of the vessel, and connections between said tanks and the cylinders H and chambers H', through which water may be admitted from said tanks, as and for the purpose described.

19. As a means for preventing the flooding of the saloons, the perforated stairways and the tanks M located thereunder, substantially as shown and described.

20. A vessel constructed, substantially as herein described, with section-plates B, which correspond in size and shape with the cross-section of the vessel at the points at which they are placed, and which are formed with bearings for the shafts of the engine, and, in combination therewith, the engine C, whose shafts are supported by the bearings in said plates, substantially as shown and described.

21. In the construction of ships, a transverse chamber extending entirely across the ship, the latter having openings through its sides to form doors for said chamber, the walls of said chamber being supported at the ends by the sides of the ship and intermediately by the division or section plates B, which divide the ship transversely, the whole forming an integral part of the structure, substantially as shown and described.

In testimony that I claim the foregoing as my invention I have signed my name, in presence of two witnesses, this 10th day of November, 1886.

ROBT. M. FRYER.

Witnesses:
 WILLIAM H. CLARKSON,
 DANIEL BATES.